United States Patent [19]

Lordo et al.

[11] Patent Number: 4,908,558
[45] Date of Patent: Mar. 13, 1990

[54] SPHERICAL MOTION SIMULATOR

[75] Inventors: Robert E. Lordo, Fort Mill, S.C.; Lloyd W. McSparran, Pittsburgh, Pa.

[73] Assignee: Contraves Goerz Corporation, Pittsburgh, Pa.

[21] Appl. No.: 184,818

[22] Filed: Apr. 22, 1988

[51] Int. Cl.$^4$ ............................ H02P 5/34; H02K 1/06
[52] U.S. Cl. ...................................... 318/648; 318/649; 318/115; 318/687; 310/12; 310/13; 310/90.5; 310/166; 244/1 R; 74/5 R; 74/5.6 D
[58] Field of Search ............... 318/648, 685, 686, 687, 318/649, 115, 135, 629; 434/2, 6, 24, 30, 35, 37, 43, 45, 46, 58, 59, 111, 186, 289, 243; 244/230, 76 R, 175, 234, 223, 1; 73/9, 147, 167, 865.6, 382, 382 G, 383; 310/90.5, 166, 216, 261; 74/5 R, 5.1, 5.12, 5.5, 5.4, 5.46, 5.7, 5.8, 5.6 D, 5.6 E, 5 F

[56] References Cited

U.S. PATENT DOCUMENTS

| Re. 27,051 | 2/1971 | Cappel | 35/12 |
|---|---|---|---|
| 3,295,224 | 1/1967 | Cappel | 35/12 |
| 3,449,843 | 6/1969 | Richter et al. | 35/12 |
| 3,697,143 | 10/1972 | Klinchuch | 308/10 |
| 3,761,747 | 9/1973 | Allaigre | 310/13 |
| 3,787,100 | 1/1974 | Habermann et al. | 308/10 |
| 3,954,024 | 5/1976 | Staats | 74/5.41 |
| 3,958,138 | 5/1976 | Eastham et al. | 310/13 |
| 4,316,394 | 2/1982 | Dohogne | 74/5.46 |
| 4,387,935 | 6/1983 | Studer | 310/90.5 |
| 4,463,290 | 7/1984 | Asakawa et al. | 318/135 |
| 4,471,253 | 9/1984 | Laing | 310/166 X |
| 4,473,259 | 9/1984 | Goldowsky | 308/10 |
| 4,511,190 | 4/1985 | Caye et al. | 308/10 |
| 4,634,889 | 1/1987 | Foggia et al. | 901/16 X |
| 4,661,737 | 4/1987 | Barri | 310/166 |
| 4,686,404 | 8/1987 | Nakazeki et al. | 310/90.5 |
| 4,707,642 | 11/1987 | Sorimachi et al. | 318/115 X |
| 4,719,381 | 1/1988 | Miles | 310/166 |
| 4,739,241 | 4/1988 | Vachtsevanos et al. | 318/115 X |

OTHER PUBLICATIONS

Stanley A. Cory, "The Nature of Linear Induction Motors", *Machine Design*, pp. 111–113, Aug. 23, 1984.
L. A. DeMore et al., "Design Study for a High-Accuracy Three-Axis Test Table", Journal of Guidance, Control and Dynamics, vol. 10, No. 1, pp. 104–114, Jan.–Feb. 1987.
Edmond R. Pelta, "Precise Positioning Without Geartrains", Machine Design, pp. 79–83, Apr. 23, 1987.
Edmond R. Pelta, "Two-Axis Sawyer Motor for Motion Systems", IEEE Control Systems Magazine, pp. 20–24, Oct. 1987.
"Linear Induction Servo Motors", Product Brochure, UNICO, Inc., Franksville, Wis. (Date unknown).
"AC PWM Servo Amplifier", Product Brochure, Unico, Inc., Franksville, Wisc. (Date Unknown).

*Primary Examiner*—William M. Shoop, Jr.
*Assistant Examiner*—Paul Ip
*Attorney, Agent, or Firm*—Ingersoll Buchanan

[57] ABSTRACT

A flight motion simulator includes a unit under test supported on a stationary frame for angular and translational movement along pitch, roll, and yaw axes. A rotor element is secured to the unit under test and has a spherical configuration. Magnetic bearings supported by the stationary frame support the rotor element in three degrees of freedom of movement. A drag-cup induction motor is mounted on the frame and connected to the unit under test to generate three degrees of freedom of movement by generating a rotating magnetic flux in a stator assembly to induce a corresponding flow of currents in the rotor element to produce torque and motion in the unit under test in the same direction as the flux movement in the stator assembly.

35 Claims, 7 Drawing Sheets

SPHERICAL MOTION SIMULATOR

BACKGROUND OF THE INVENTION

1. Field of the Invention

This invention relates to a flight motion simulator for testing an inertial guidance control system that simultaneously simulates rotational and translational movement of a unit under test in three orthogonal axes.

2. Description of the Prior Art

Motion simulators are utilized to produce fore and aft, lateral, elevational, roll, pitch and yaw movements or any combination of such movements to test guidance control systems used in missiles, satellites and the like. A known six degree of freedom simulator, as disclosed in U.S. Pat. No. 3,295,244, comprises three mutually perpendicular axes of linear movement and three axes of rotational movement, one of the axes being normal to the other two. A platform is supported above a base by six powered and linearly controlled actuators. Each actuator extends between the platform and the base to provide vertical linear translation and pitch and roll motions of the platform.

U.S. Pat. No. 3,449,843 discloses a light weight six degree of freedom simulator for zero gravity study. The simulator includes a base levitated by air bearing pads on a smooth floor. The bearing pads provide two degrees of translational freedom in a horizontal plane and one degree of rotational freedom about a vertical axis. Extending upwardly from the three-legged base is a column on which is mounted a pair of bearings and an elongated parallelogram. A seat assembly is mounted on the parallelogram to translate vertically therewith. This arrangement provides three degrees of translational freedom and three degrees of rotational freedom of the motion simulator.

It is also known in inertial instrumentation to support gyroscopes and accelerometers by means of electrical fields. For example, an inertial member in the form of a perfect sphere is maintained centered precisely at the center of an electrode support structure. Electric fields are established by a set of electrodes forming a spherical envelope about the inertial member. Three pairs of electrodes are utilized to generate electrical support fields along one of three orthogonal axes. U.S. Pat. No. 3,954,024 discloses an inertial support in which three pairs of electrodes are utilized and in the event the inertial member is not perfectly centered, a closed loop servo control restores a conductive sphere to a centered position between support electrodes.

U.S. Pat. No. 3,697,143 discloses an electrostatically supported gyroscope in which a conductive ball is supported between pairs of electrodes. A suspension utilizes a plurality of amplifiers for sensing the voltage difference between electrodes of a pair. A control system detects displacement of the ball with respect to the electrode pair. A displacement signal is generated to apply a charge to the electrodes in a direction and with a force for restoring the ball to a centered position between the electrodes. It is also known, as disclosed in U.S. Pat. No. 4,511,190 to utilize magnetic bearings for controlling the attitude of artificial satellites.

While it is known to utilize electrostatic and hydraulic means for supporting a unit under test in a motion simulator, the known motion actuators are limited in the response time of the actuator to generate the required motion upon actuation. Conventionally, with a unit under test supported in a gimballed system, the natural resonant frequency of the gimballed system limits the bandwidth that is achievable to about 75 Hz. Therefore, there is need for a motion simulator that efficiently simulates vibration characteristics at frequencies greater than the frequencies achievable by conventional torque actuators.

SUMMARY OF THE INVENTION

In accordance with the present invention, there is provided a flight motion simulator that includes a unit under test. A stationary frame supports the unit under test for angular and translational movement. A rotor element is secured to the unit under test. The rotor element has a spherical configuration. Magnetic bearing means supported by the stationary frame support the rotor element in three degrees of freedom of movement. Drive means mounted on the stationary frame and connected to the unit under test generates torque in three degrees of freedom of movement. Means for sensing the position of the unit under test relative to the stationary frame controls the drive means to generate torque for moving the unit under test in a selected one of the three degrees of freedom of movement.

Further in accordance with the present invention, there is provided apparatus for generating three degrees of movement in a motion simulator that includes a movable member and a stationary member. Bearing means supports the movable member on the stationary member for movement in three orthogonal axes. A rotor element has a spherical surface and is fixed to the movable member. A stator assembly is secured to the stationary member and positioned in close proximity to one surface of the rotor element. The stator assembly has a configuration conforming to the configuration of the rotor element. A magnetic flux carrying member is secured to the stationary member and positioned in close proximity to an opposite surface of the rotor element. A plurality of three phase electrical windings are wound around the stator assembly. Each of the electrical windings is positioned orthogonal to one another on the stator assembly. The windings, upon supply of polyphase current thereto, generate a rotating magnetic flux in the stator assembly to induce a corresponding flow of currents in the rotor element to produce torque and motion in the movable member in the same direction as the flux movement in the stator assembly.

Additionally, in accordance with the present invention, there is provided a method for simulating motion in a test unit that includes the steps of positioning a test unit on a stationary frame. The test unit is supported for angular and translational movement on the stationary frame. The position of the test unit is sensed relative to the stationary frame. A rotor element is mounted on the test unit. A stator assembly is secured to the stationary frame in close proximity to the rotor element. First and second electrical windings are supported on the stator assembly to extend in an orthogonal relationship to one another. Polyphase current is injected through the first and second electrical windings to generate a rotating magnetic flux in the stator assembly. Flow of currents is induced in response to the rotating magnetic flux in the rotor element to produce torque and motion in the test unit in the same direction as the flux movement in the stator assembly.

Accordingly, the principal object of the present invention is to provide a motion simulator having unlimited travel in the roll axis and limited travel in the pitch and yaw axis.

Another object of the present invention is to provide a spherical motion simulator operable to generate rotational and translational movement of a unit under test in three orthogonal axes.

An additional object of the present invention is to provide a six degree of freedom motion simulator with unlimited travel in the roll axis, limited travel in the pitch and yaw axes, and limited translational motion in the X, Y, and Z axes.

Another object of the present invention is to utilize magnetic bearings for supporting a unit under test for movement in six degrees freedom in a flight motion simulator.

An additional object of the present invention is to utilize a drag-cup induction motor for generating torque in pitch, yaw, and roll axes of a unit under test in a flight motion simulator.

These and other objects of the present invention will be more completely disclosed and described in the following specification, the accompanying drawings and the appended claims.

DESCRIPTION OF THE PREFERRED EMBODIMENTS

Figure 1:
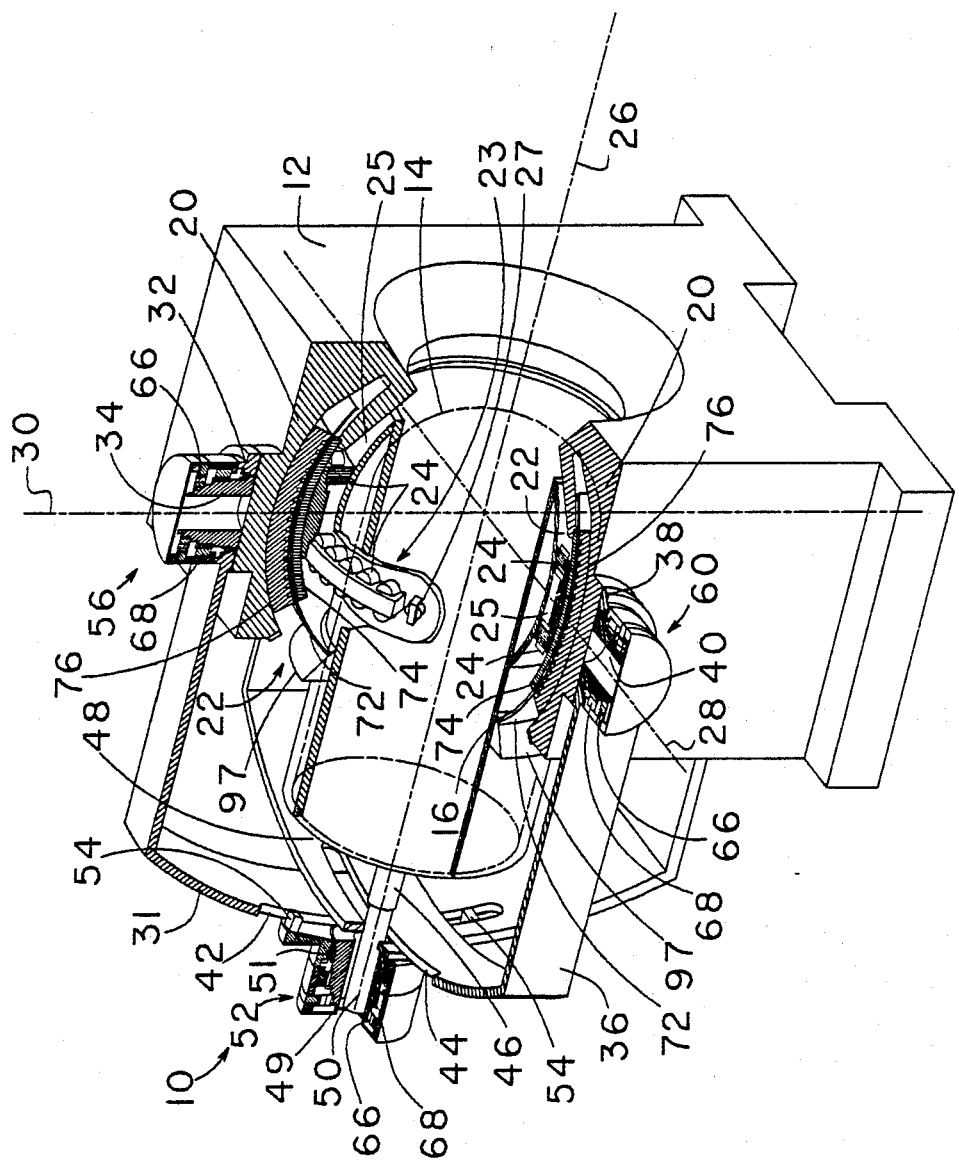
FIG. 1 is a fragmentary perspective view partially in section of a flight motion simulator in accordance with the present invention.
Figure 4:
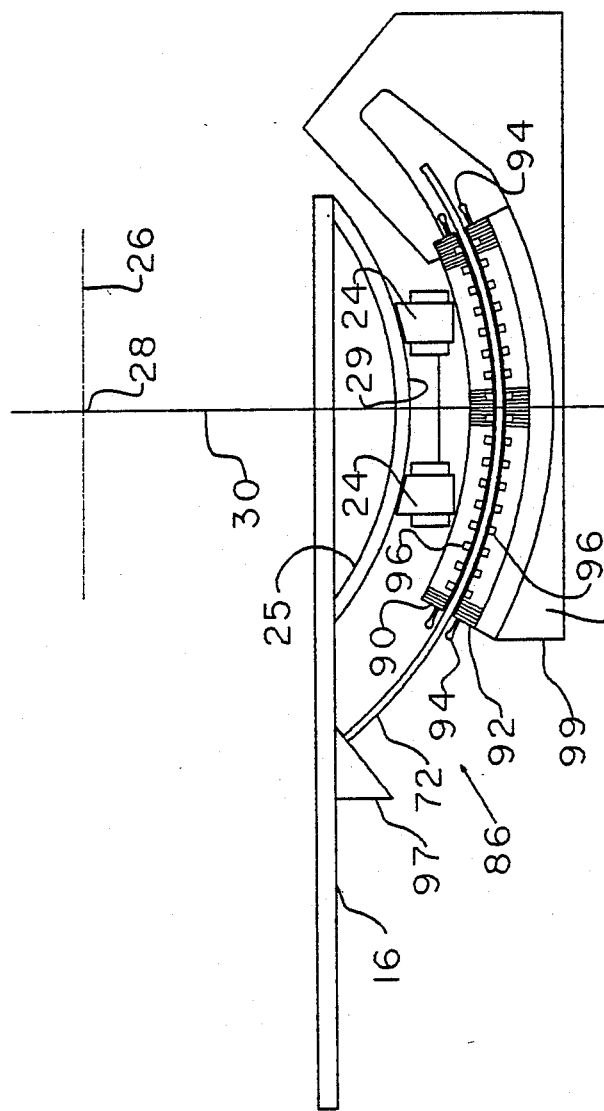
FIG. 4 is an enlarged fragmentary schematic illustration of one embodiment of a drag-cup induction type motor that includes a pair of stators positioned on opposite sides of a spherical rotor.
Figure 5:
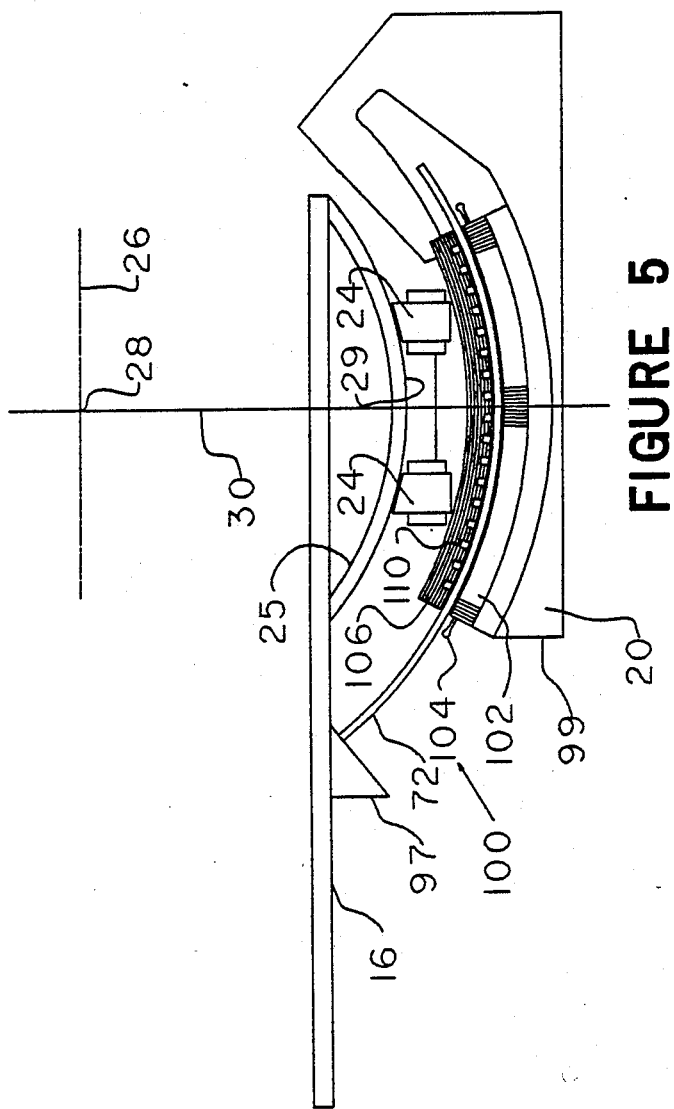
FIG. 5 is a view similar to FIG. 4, illustrating a drag-cup type induction motor having a pair of single slotted stators on opposite sides of spherical rotor.

Referring to the drawings and particularly to FIG. 1, there is illustrated a flight motion simulator generally designated by the numeral 10 that includes a stationary frame 12 for supporting a unit 14 under test, illustrated in phantom, fixed within a movable member 16 that is supported by a gimballed system for movement in six degrees of freedom. The stationary frame 12 includes a support housing 20 having an arcuate configuration for receiving and supporting a drag-cup induction motor generally designated by the numeral 22. A magnetic bearing suspension system generally designated by the numeral 23 includes a plurality of spherical magnetic bearings 24 positioned adjacent a rotor element 25 to support the movable member 16 for rotational and translational motion. Air gap sensor devices 27 and associated electronic control means (not shown) measures the width of an air gap 29 as shown in FIGS. 4 and 5 between the magnetic bearings 24 and the rotor element 25. The devices 27 are located at fixed positions around the periphery of the spherical surface of rotor element 25 to deduce translational movement of rotor element 25.

In accordance with the present invention, the unit 14 under test, together with the movable member 16, is completely rotatable within the stationary frame 12 about a roll axis 26. Partial rotational movement of the combined unit 14 under test and member 16 within a selected field of view is also produced along a pitch axis 28 and a yaw axis 30. As will be explained later in greater detail, the unit 14 under test is also movable translationally in a limited range along the three axes 26, 28 and 30 to thereby provide six degrees of freedom of motion for the unit 14.

The gimballed system for movably supporting the unit 14 and member 16 on the frame 12 includes a first linkage arm 31 that is supported for pivotal movement about the yaw axis 30 by bearings 32 which are supported on journals 34, only one of which is shown in FIG. 1. A second linkage arm 36 is supported on the frame 12 for pivotal movement about the pitch axis 28 by bearings 38 also supported on journals 40 that extend outwardly from the frame 12. Only one of the journals 40 is shown in FIG. 1.

Each of the linkage arms 31 and 36 includes elongated slots 42 and 44 respectively. An engagement member, such as a pin 46, is connected and extends outwardly from end portion 48 of the member 16 and extends through the slot 44 in linkage arm 36. End portion 50 of pin 46 is received within a journal 49 supported by bearings 51 retained in a readout assembly generally designated by the numeral 52. The readout assembly 52 is retained by anti-rotation pins 54 within the slot 42 of the linkage arm 31. The readout assembly 52 includes a conventional resolver or angular position encoder to sense rotational movement of the member 16 above the roll axis 26.

Similar to the readout assembly 52 on the end 50 of pin 46, a readout assembly 56 is positioned on journal 34 that extends from the support housing 20 coaxial with the yaw axis 30. Another readout assembly 60 is mounted on journal 40 that extends from the stationary support housing 20 coaxially aligned with the pitch axis 28.

Each of the readout assemblies associated with the axes 26, 28 and 30 includes a resolver mechanism 66 and a tachometer 68 as known in the art. The operation of the resolver 66 and tachometer 68 is well known and therefore will not be discussed in detail. It is the function of the resolver 66 associated with each of the readout assemblies 52, 56 and 60 on the three axes 26, 28 and 30 to sense the angular displacement of the unit 14 about the respective axes. The angular displacement sensed is converted by the resolvers 66 for the roll, pitch and yaw axes into electrical input signals which are transmitted to a motor control circuit generally designated by the numeral 70 in FIG. 7.

The input signals to the circuit 70 from each of the readout assemblies provides a frame of reference of the relative positions of the pitch, yaw, and roll axes. As will be explained later in greater detail, the control circuit 70 is operable to compare the relative positions represented by the input signals to the desired position of the axes. As a result of this comparison, an output signal is transmitted to the respective drag-cup motors 22 to establish the appropriate amplitude, frequency and phase sequence of voltage to apply to the motors for the corresponding motion of the unit 14 under test.

The induction motors 22 control the movement of the unit 14. Upon pivotal movement of the member 16 about the respective axes 26, 28 and 30, the pin 46 is movable in the slot 44. When the member 16 pivots about the yaw axis 30, the linkage arm 31 moves with the member 16, resulting in movement of the resolver 66 for the readout assembly 56. Pivotal movement of the member 16 about the pitch axis 28 results in corresponding movement of the linkage arm 36 and rotation of the readout assembly 60. Preferably, the pin 46 and linkage arms 31 and 36 have low inertia and friction to minimize the input of error into the sensing of the movement of the unit 14 under test.

As illustrated in FIG. 1, the drag-cup induction motors 22 have a spherical shell geometry that permits the generation of torque in three degrees of freedom of movement. In one embodiment, four induction motors 22 are positioned in spherical segments around the test unit 14. Each induction motor 22 includes a rotor element 72, preferably fabricated of copper or aluminum, and formed integral with the movable member 16. A rotor element 72, as shown in FIG. 1, is positioned between a stationary magnetic flux carrying element 74 and a stator element 76 which is stationarily positioned on the support housing 20.

Figure 2:
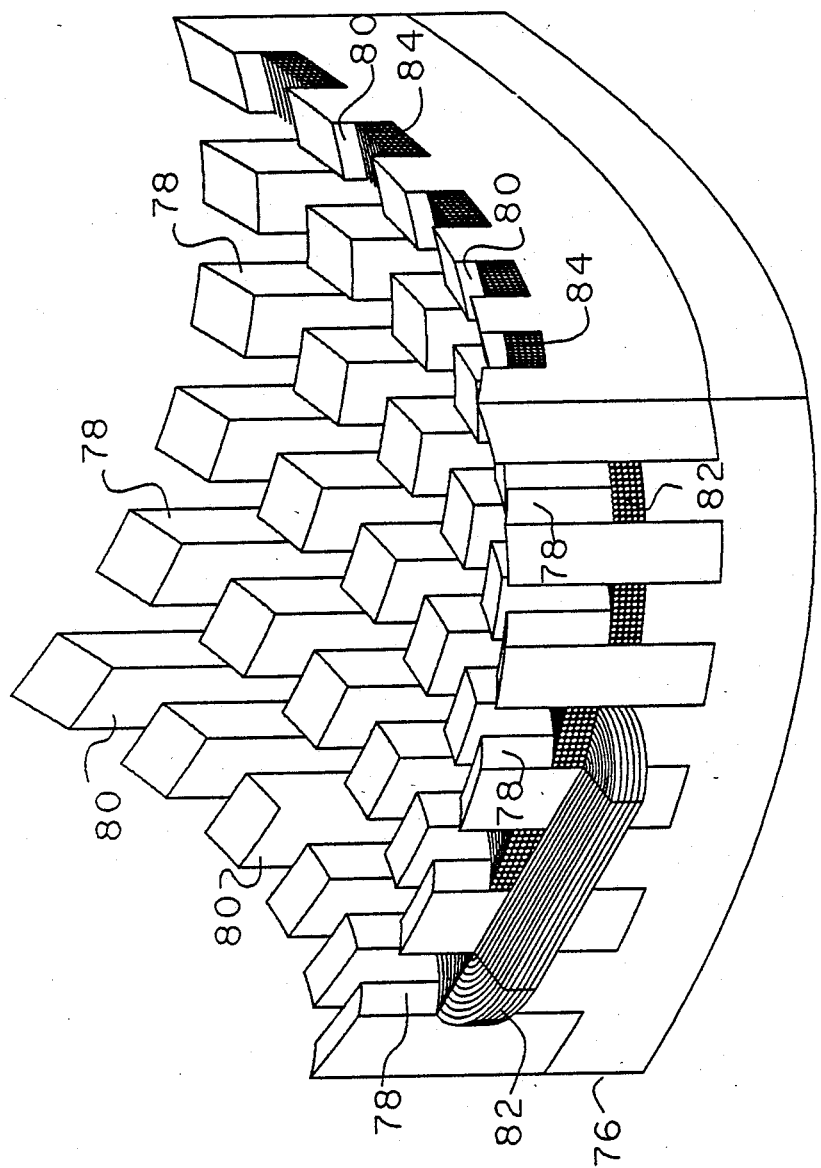
FIG. 2 is an enlarged orthographic illustration of a spherical stator segment of a drag-cup type induction motor used in the motion simulator of the present invention.
Figure 3:
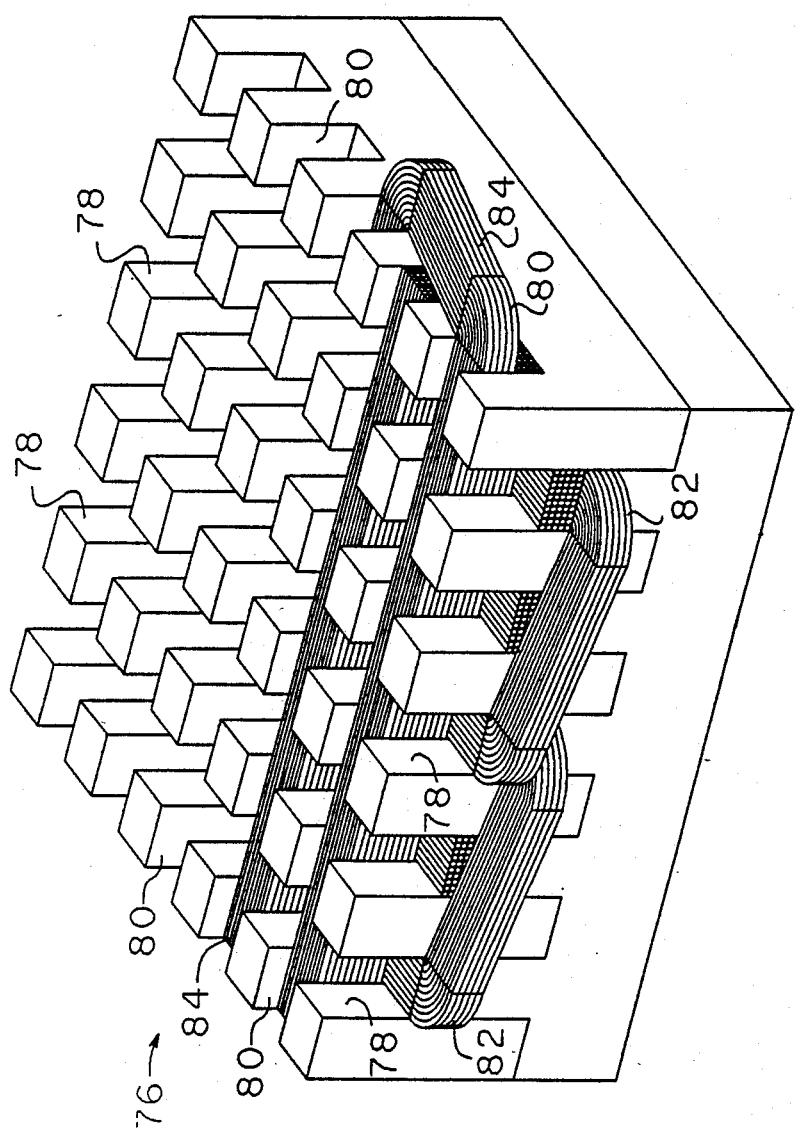
FIG. 3 is an enlarged fragmentary orthographic view of a stator segment, illustrating the stator slotted in two directions with overlying electrical windings positioned in the slots.

FIG. 2 illustrates the spherical configuration of a representative stator element 76 and includes a set of slots 78 that extend in one direction which is orthogonal to another set of slots 80. As shown in FIG. 2 the stator slots 78 and 80 receive polyphase windings 82 and 84 respectively. The windings 82 and 84 are positioned orthogonal to each other. Positioning the windings 82 and 84 diametrically opposite each other, when energized from the same AC source, produces a rotating flux field. As shown in FIG. 3 the stator element 76 is planar rather than spherical.

By supplying three phase currents in both of the windings 82 and 84, roll motion and pivotal motion is generated in the movable member 16. For example, by supplying current to the windings 82 and 84 with the stator elements 76 positioned at the top and bottom of the simulator 10, both roll and pitch torques are induced in the rotor element 72. The pitch torque produces a motion about the pitch axis 28. Similarly, supplying polyphase AC current in a selected one of the windings of the stator elements 76 positioned on the sides of the motion simulator 10 results in motion about the yaw axis 30.

Flux produced by the currents in the stator elements 76 pass through the rotor element 72, which is, as indicated above, fabricated of a highly conductive material such as aluminum or copper. As the flux wave propagates along the stator elements 76 eddy currents are induced in the rotor element 72 producing a reaction torque. Thus, in accordance with the present invention, where the surfaces of the stator elements 76, as shown in FIG. 1, are spherical in shape and are positioned at 90 degrees relative to one another, mutually perpendicular torques are applied to the rotor element 72.

Now referring to FIG. 4, there is illustrated an embodiment of an alternate form of a drag-cup induction motor generally designated by the numeral 86 that includes a pair of laminated stator elements 90 and 92, each having a segmented spherical configuration. Each stator element 90 and 92 is slotted in two orthogonal directions and polyphase windings 94 and 96 are positioned in the slots. The wound stator elements 90 and 92 are positioned on both sides of a spherically-shaped rotor element 72 with an air gap provided between the opposite surfaces of the rotor 72 and the respective stator elements 90 and 92. With this arrangement, the torque developed per unit of area is approximately twice the torque developed by a single-sided stator arrangment as illustrated in FIG. 1.

As with the drag-cup induction motor shown in FIG. 1, the induction motor 86 shown in FIG. 4 produces roll motion in the moving member 16 when multiphase AC current is supplied to the windings 94. Supplying polyphase AC current in windings 96 of the stator elements 90 and 92 located at the top and bottom of the motion simulator 10 produces motion about the pitch axis 28. Also, when polyphase current is supplied to the windings 96 of the stator elements 90 and 92 positioned on the sides of the motion simulator 10, movement of the member 16 is generated about the yaw axis 30. Also stops 97 and 99 are provided to limit movement of the member 16 and rotor element 72.

Now referring to FIG. 5, there is illustrated a further embodiment of a drag-cup induction motor, generally designated by the numeral 100 adaptable for use with the present invention that includes a laminated stator element 102 slotted into only one direction for receiving polyphase windings 104. However, a second spherical segmented stator element 106 is positioned oppositely of the first stator element 102 with a rotor element 72 positioned therebetween, as discussed above with regard to the embodiment shown in FIG. 4. The stator element 106 also includes a plurality of slots. The slots in stator element 106 are orthogonal to the corresponding slots in stator element 102. The windings 110 are positioned in the slots of the stator element 106 and are thus orthogonal to the windings 104.

Figure 6:
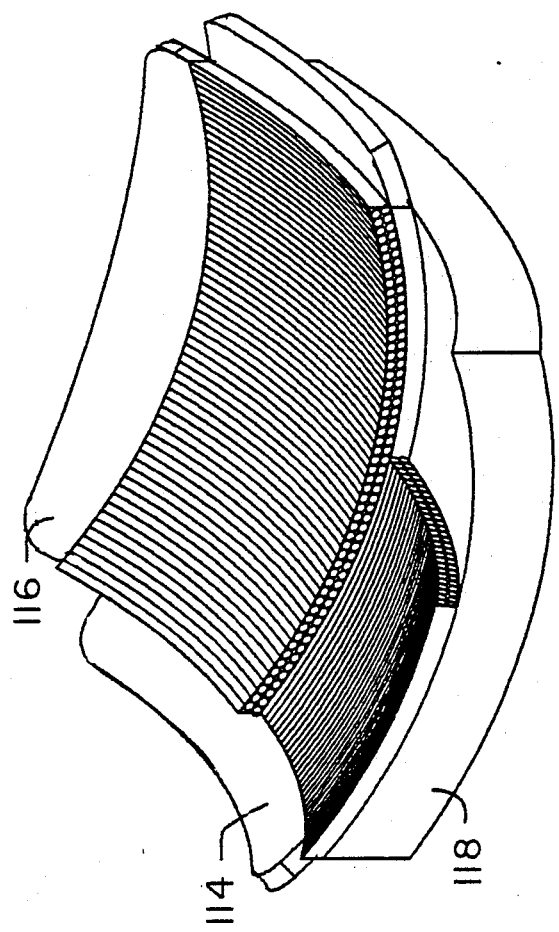
FIG. 6 is an enlarged fragmentary orthographic view of a stator segment in which the windings are bonded to the surface of the stator magnetic structure.

The stator elements described above in regard to the various embodiments of the drag-cup induction motors 22, 86, and 100, shown in FIGS. 1, 4 and 5 all include a slotted configuration. Another embodiment of the stator element 76 of drag-cup induction motor shown in FIG. 1 is illustrated in FIG. 6. As shown in FIG. 6 winding elements 114 and 116 are bonded to the surface of a flux carrying element 118 which is part of the stator. Further, the windings 114 and 116 occupy a portion of the air gap between the flux carrying members 118 and element 74. The windings 114 and 116 are each in the form of layers where the layers are bonded together. This arrangement facilitates the generation of uniform ripple-free torque produced at any angle of motion.

With each of the drag-cup induction motors discussed above, the rotor element is shaped in a spherical shell geometry so that three dimensions of torque can be simultaneously induced in the rotor element. The stationary wound stator elements are located interior to and/or exterior to the rotor element. Preferably, the stator elements in each of the embodiments as shown in FIGS. 1, 4, 5 and 6 are segregated into quadrants of individual elements having an arcuate configuration that corresponds to a segment of a sphere.

Each of the segments comprising the stator elements contain two sets of the three-phase windings which are, as above described, orthogonal to one another. The windings are positioned opposite one another and are energized from the same three phase source thus producing a rotating flux field. By supplying three phase currents in both of the two sets of stator element windings the magnetic flux in the stator element can be made to rotate not only in a single degree of freedom but in two degrees of freedom.

The moving flux in the stator element induces currents in the rotor element which in turn generates torque and motion in the same direction as the flux movement in the stator element. Consequently, two degrees of freedom of rotor motion results from energizing a pair of stator elements. Accordingly, by inducing currents in stator elements positioned at the top and bottom of the simulator 10, both roll and pitch torques are produced in the rotor element. Similarly, the stator elements on both sides of the simulator 10 are utilized to produce both roll and yaw torques.

Preferably, the windings of the drag-cup induction motors of the present invention are driven by three transistorized three phase, variable voltage, variable frequency, sine wave inverters. The inverters suitable for use with the drag-cup induction motors of the present invention are known in the art and therefore will not be described herein in detail.

Figure 7:
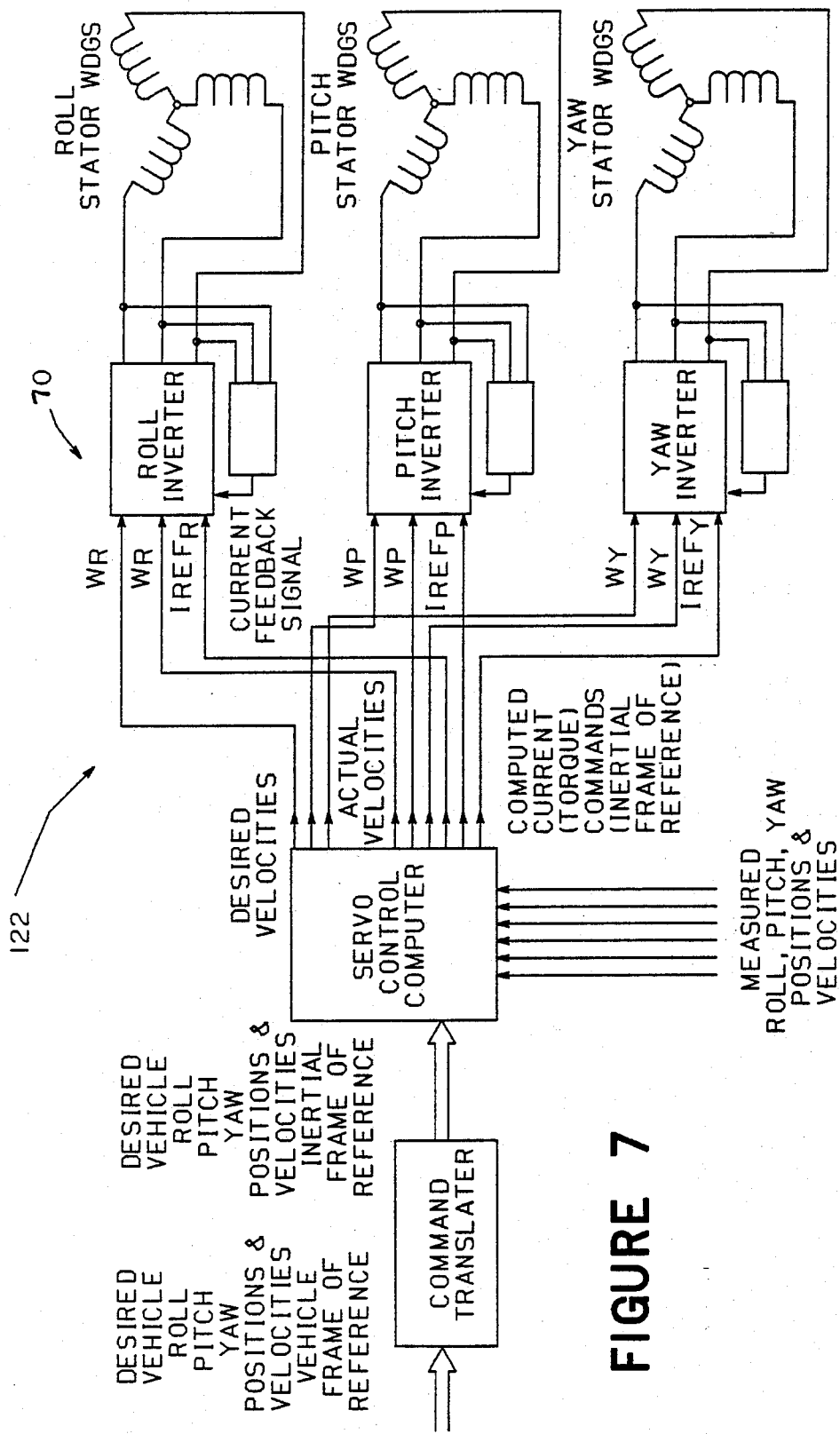
FIG. 7 is a schematic illustration of a control system for operation of the drag-type induction motors in the motion simulator of the present invention.

Now referring to FIG. 7 there is schematically illustrated a control system 122 for operating the drag-cup induction motors of the present invention. The control system 122 receives feedback signals from the readout assemblies 52, 56 and 60 illustrated in FIG. 1. The input signals serve as a frame of reference for the simulator roll, pitch and yaw positions, as well as a simulation of vehicle velocities. The input signals are converted into a coordinate system by a command translator that includes in one embodiment a conventional microprocessor. Output from the command translator is transmitted to a servo control computer which compares the measured roll, pitch, and yaw positions and velocities with selected values thereof. Then the servo control computer calculates the appropriate current reference signals $I_{ref}$ to be transmitted to the roll, pitch and yaw inverters. In addition, the computer transmits to the respective inverters the actual velocity signal $W_R$, for the roll invertor, $W_P$, for the pitch convertor, and $W_Y$, for the yaw invertor. In addition, a signal representing the desired velocities, $W_R$ $W_P$ and $W_Y$ are transmitted to the roll, pitch and yaw inverters.

The respective input signals to the inverters are utilized by the inverters to provide a resultant output signal transmitted to each of the windings of the respective stator elements to generate the selected amplitudes, frequencies, and phase sequence of voltage to apply to the windings. Also, as seen in FIG. 7, a current feedback signal is also transmitted from the output of each inverter for adjustments in the output signal.

As discussed above, the magnetic bearings 24, illustrated in FIG. 1, are operable to suspend the moveable member 16 of the motion simulator 10. With this arrangement, it is possible to simulate vibration characteristics in the form of high frequency components of translational motion. By utilizing spherical shaped magnetic bearings there is no contact between the rotor element and the stator element, and as a result there is no friction in the usual sense. The only resistance to motion is incurred by a very small amount of hysteresis loss in the rotor iron as the flux reverses in each element of the rotor iron as it passes from pole to pole. This loss is very uniform and therefore the associated drag has virtually no impact on angular positioning accuracy.

By use of spherical-shaped magnetic bearings, three dimensional rotation can be achieved with a high degree of precision without requiring a high degree of machining precision. This is possible because the air gap in a magnetic bearing is large, similar to the air gap in an electric motor. As a result, minor amounts of runout, surface irregularity, or lack of concentricity have little impact on the rotor element as it rotates. Further by utilizing magnetic bearings, the component of pointing error associated with the intersection of the axes is substantially reduced or eliminated. This is possible because the position of the rotor within the spherical magnetic bearing can be adjusted with three reference position potentiometers corresponding to the X, Y, and Z axes in the magnetic bearing position control loops.

A magnetic bearing adaptable for use in the present invention includes a pair of rows of electromagnets where the pairs are equally spaced around a rotor member, such as the movable member 16 illustrated in FIG. 1, that has a ferrous outer ring in close proximity to the electromagnets. Forces are exerted on the rotor member by supplying current in the coils of the electromagnets. By adjusting the currents in each electromagnet, the forces are brought into balance to permit the rotor member to be positioned at rest in a levitated state under a condition of equalized forces.

As a rule, a balanced condition represents an unstable equilibrium point because the attractive force of each electromagnet varies inversely with the distance between the rotor member and the poles of the electromagnet. Consequently, if the rotor member moves an infinitesimal distance from the point of equilibrium, the forces become unbalanced so as to cause the rotor member to move even farther from the equilibrium point. Consequently, as it is well known in the art, in order to achieve a stable suspension of the rotor within the magnetic field, it is necessary to close a position loop around the unstable force producing system and to provide compensation for the unstabilizing force nonlinearlity.

The air gap sensors 27, shown in FIG. 1, are of the inductive or eddy-current type. In combination with a high frequency source of excitation and an amplitude demodulator, the air gap sensors 27 are used to sense the rotor element position within the air gap. Preferably eight air gap sensors 27 are spread around the periphery of the rotor element 25 and positioned adjacent and between the magnetic bearings 24. The bearings 24 have a spherical configuration which facilitates unrestrained angular motion of the unit under test 16 in three angular degrees of freedom.

In operation the air gap sensors 27 being in close proximity with the magnetic bearings 24 constantly monitor the width of the air gap 29 between the bearings 24 and the spherical surface of the rotor member 25. Feedback signals are transmitted from the sensors 27 to a control means which in response to the measured gap signal control the currents to each of the magnetic bearings to maintain the desired air gap for a desired distance between the rotor element 72 and the stator element 76. In this manner the desired center of rotation of the simulator 10 is maintained.

Also, in accordance with the present invention, a plurality of position sensors are used to sense the air gaps between the rotor and stator members of the magnetic bearings. Because these sensors are not on the axes of each of the control loops it is necessary to algebraically combine the signals to obtain the rotor displacement signals along each of the control loop axes.

In operation of the flight motion simulator 10 of the present invention, angular position sensing means are utilized to measure the rotation of the spherical rotor element about the three orthogonal axes. This is accomplished in one method by utilizing a known optical in-plane surface motion sensor. This type of sensing device utilizes a non-contact technique permitting a stand-off distance between the sphere surface and the sensor. Preferably to cover the three degrees of freedom (roll, pitch and yaw) with one level of redundancy, a total of six sensors in four packages are utilized. The sensors are located at four positions in the pitch-yaw plane, separated by 90 degrees in which two sensors are positioned in each of diametrically opposed locations and single sensors in the other two locations. This is only one type of angular position sensing device adaptable for use of the present invention.

According to the provisions of the patent statutes, we have explained the principle, preferred construction and mode of operation of our invention and have illustrated and described what we now consider to represent its best embodiments, however, it should be understood that, within the scope of the appended claims, the invention may be practiced otherwise than as specifically illustrated and described.

We claim:

1. A flight motion simulator comprising,
   a unit under test,
   a stationary frame for supporting the unit under test for angular and translational movement,
   a rotor element secured to said unit under test, said rotor element having a spherical configuration,
   magnetic bearing means supported by said stationary frame for supporting said rotor element for angular and translational movement,
   drive means mounted on said stationary frame and connected to said unit under test for generating torque in three angular degrees of freedom of movement, and
   means for sensing the position of the unit under test relative to said stationary frame to control said drive means to generate torque for moving the unit under test in a selected one of the three degrees of freedom of angular movement.

2. Apparatus for generating three degrees of movement in a motion simulator comprising,
   a movable member,
   a stationary member,
   bearing means for supporting said movable member on said stationary member for rotational movement in three orthogonal axes,
   a rotor element having a spherical surface, said rotor element fixed to said movable member,
   a stator assembly secured to said stationary member and positioned in close proximity to one surface of said rotor element, said stator assembly having a configuration conforming to the configuration of said rotor element,
   a magnetic flux carrying member secured to said stationary member and positioned in close proximity to an opposite surface of said rotor element,
   said stator assembly including a plurality of polyphase electrical windings, each of said electrical windings being positioned orthogonal to one another on said stator assembly, and
   said windings upon the supply of polyphase current thereto generating a rotating magnetic flux in said stator assembly to induce a corresponding flow of currents in said rotor element to produce torque and motion in said movable member in the same direction as the flux movement in said stator assembly.

3. A method for simulating motion in a test unit comprising the steps of,
   positioning a test unit on a stationary frame,
   supporting the test unit for angular and translational movement on the stationary frame,
   sensing the position of the test unit relative to the stationary frame,
   mounting a rotor element on the test unit,
   securing a stator assembly to the stationary frame in close proximity to the rotor element,
   supporting first and second electrical windings on the stator assembly to extend in an orthogonal relationship to one another,
   injecting polyphase current through the first and second electrical windings to generate a rotating magnetic flux in the stator assembly, and
   inducing flow of currents in response to the rotating magnetic flux in the rotor element to produce torque and motion in the test unit in the same direction as the flux movement in the stator assembly.

4. A flight motion simulator as set forth in claim 1 which includes,
   said unit under test having roll, pitch, and yaw axes,
   said magnetic bearing means supporting said unit under test for movement about a selected one of said axes, and
   said drive means including a plurality of assemblies selectively positioned on the periphery of said rotor element to generate torque of said rotor element about said axes.

5. A flight motion simulator as set forth in claim 1 in which,
   said drive means includes a plurality of drag-cup induction motors positioned in arcuately shaped segments around said unit under test.

6. A flight motion simulator as set forth in claim 5 which includes,
   each of said drag-cup induction motors having a shell configuration conforming to the spherical configuration of said rotor element for generating torque of said rotor element in three degrees of freedom of movement.

7. A flight motion simulator as set forth in claim 1 in which,
   said drive means includes a plurality of stator segments positioned on said stationary frame in close proximity to and around said rotor element,
   each of said stator segments having a configuration conforming to said spherical configuration of said rotor element,
   a pair of three phase electrical windings supported in orthogonal relation to each other on each of said stator segments, and
   means for supplying alternating current power to said electrical windings to produce a magnetic flux in said stator segments to induce current in said rotor element and produce corresponding torque and motion in said rotor element.

8. A flight motion simulator as set forth in claim 1 which includes,
   said drive means including a stator element supported by said stationary frame in spaced relation closely adjacent to one surface of said rotor element, and
   said stator element including electrical means for inducing electrical current in said rotor element to generate motion of said rotor element in a selected one of three orthogonal axes.

9. A flight motion simulator as set forth in claim 8 which includes,
a magnetic flux carrying element supported by said stationary frame in spaced relation closely adjacent to the opposite surface of said rotor element.

10. A flight motion simulator as set forth in claim 8 which includes,
a second stator element supported by said stationary frame in spaced relation closely adjacent to an opposite surface of said rotor element,
said second stator element and said first mentioned stator element being aligned with one another on opposite sides of said rotor element, and
said first and second stator elements including polyphase electrical windings where said windings are positioned orthogonal to each other.

11. A flight motion simulator as set forth in claim 1 which includes,
said drive means including four stator elements located in quadrant relationship to one another around the periphery of the unit under test, and
each of said stator elements having an arcuate configuration.

12. A flight motion simulator as set forth in claim 1 in which,
said magnetic bearing means includes means for translationally displacing said rotor element.

13. Apparatus as set forth in claim 2 which includes,
said stator assembly including four stator elements located in quadrant relationship to one another around the periphery of the unit under test, and
said stator assembly having an arcuate configuration.

14. Apparatus as set forth in claim 2 in which,
said stator assembly includes a first set of slots positioned in side-by-side relationship on said stator assembly,
a second set of slots positioned in side-by-side relationship on said stator assembly,
said second set of slots being positioned orthogonally relative to said first set of slots, and
each of said set of slots receiving said electrical windings.

15. Apparatus as set forth in claim 2 which includes,
a pair of said stator assemblies positioned at top and bottom quadrants of said rotor element, and
said windings upon energization by polyphase current generating roll and pitch torques in said rotor element.

16. Apparatus as set forth in claim 2 which includes,
a pair of said stator assemblies positioned at side quadrants of said rotor element, and
said windings upon energization by polyphase current generating roll and yaw torques in said rotor element.

17. Apparatus as set forth in claim 2 which includes,
two sets of said windings positioned in overlying orthogonal relationship to each other, and
said windings being bonded to each other and to said stator assembly to maintain the orthogonal relationship of said windings on said stator assembly.

18. Apparatus as set forth in claim 2 in which,
said magnetic flux carrying member includes a second stator assembly positioned oppositely of said first mentioned stator assembly with said rotor element positioned therebetween, and
each of said stator assemblies including a plurality of slots positioned in side-by-side relation for receiving said windings where said slots in said first mentioned stator assembly are positioned orthogonally relative to said slots in said second stator assembly to position said windings in orthogonal relationship.

19. A method as set forth in claim 3 which includes,
maintaining the first and second electrical windings in first and second sets of orthogonally positioned slots in the stator assembly.

20. A method as set forth in claim 3 which includes,
positioning a pair of the stator assemblies each wound with orthogonally positioned windings on opposite sides of the rotor element.

21. A method as set forth in claim 3 which includes,
positioning a stator assembly on opposite sides of the rotor element, and
positioning a pair of electrical windings on each stator assembly in an orthogonal relationship to one another.

22. A method as set forth in claim 3 which includes,
bonding the first and second electrical windings in orthogonal relationship to the surface of the stator assembly.

23. A method as set forth in claim 3 which includes,
positioning a stator assembly on opposite sides of the rotor element,
positioning one set of electrical windings on one stator assembly, and
positioning another set of electrical windings on the other stator assembly with the electrical windings being positioned in orthogonal relationship.

24. A method as set forth in claim 3 which includes,
positioning one of the stator assemblies at the top of the rotor element,
positioning another of the stator assemblies at the bottom of the rotor element, and
energizing the electrical windings of the respective stator assemblies to generate roll and pitch torques in the rotor element.

25. A method as set forth in claim 3 which includes,
positioning one of the stator assemblies at one side of the rotor element,
positioning another of the stator assemblies at the opposite side of the rotor element, and
energizing the electrical windings of the respective stator assemblies to generate roll and yaw torques in the rotor element.

26. A linear induction motor comprising,
a stationary frame,
a conductive member supported for translational movement in two degrees of freedom on said stationary frame,
a stator element supported by said frame in spaced relation to one side of said conductive member,
a magnetic flux carrying element positioned adjacent to the opposite side of said conductive member,
a pair of polyphase current windings supported in orthogonal relationship on said stator element, and
a source of AC power supplied to said windings to generate a magnetic flux in said stator element and induce electrical current in said conductive member to produce a translational force acting in two degrees of freedom between said conductive member and said stationary frame.

27. A linear induction motor as set forth in claim 26 which includes, said stator element having a plurality of spaced parallel slots in the surface thereof, a first set of said slots being positioned in perpendicular relation to a second set of said slots, and said pair of windings being positioned in said first and second sets of slots to maintain said pair of windings in orthogonal relationship to one another.

28. A linear induction motor as set forth in claim 26 which includes, said pair of windings being bonded to each other and said bonded pair of windings being bonded to the surface of said stator element, an air gap formed between the surface of said conductive member and the surface of said stator element, and said pair of windings positioned in said air gap.

29. A linear induction motor as set forth in claim 26 which includes, said stator element being formed by a lamination of magnetic flux-carrying material.

30. A linear induction motor as set forth in claim 26 in which, said magnetic flux carrying element includes a second stator element, and a coil of windings supported by said second stator element in orthogonal relationship to said windings supported on said first mentioned stator element.

31. A magnetic suspension system comprising, a stationary frame, a magnetic flux carrying rotor member positioned relative to said frame, said rotor member having a spherical surface, a plurality of electromagnets supported by said frame and spaced around the periphery of said rotor member to generate three dimensional forces of attraction on said rotor member, each of said electromagnets having a coil and a pole face, each of said pole faces being positioned in close proximity to said surface of said rotor member to form an air gap therebetween, power means for supplying said electromagnet coils with current to generate a magnetic force upon said rotor member and position said rotor member in a levitated state relative to said frame, air gap sensing means for detecting the three dimensional relative position between said rotor member and said stationary frame, and means for controlling the current to each of said electromagnet coils to adjust the magnetic force exerted by each of said electromagnets and maintain said rotor member positioned in a preselected translational relationship relative to said frame.

32. A magnetic suspension system as set forth in claim 31 which includes, said air gap sensing means being supported by said frame in close proximity to each of said electromagnets for sensing the position of said rotor member in said air gap.

33. A magnetic suspension system as set forth in claim 31 in which, said air gap sensing means includes a plurality of air gap sensors spaced around the periphery of said rotor member adjacent and between said electromagnets, and each of said air gap sensors being operable to constantly monitor the width of said air gap between said electromagnet pole face and said spherical surface of said rotor member.

34. A magnetic suspension system as set forth in claim 31 in which, said air gap sensing means is positioned on said rotor member for measuring the width of said air gap between said electromagnet pole face and said spherical surface of said rotor member, and control means for adjusting said power means to control the magnitude of current supplied to said coil of each electromagnet and the resultant magnetic force applied to said rotor member to maintain the desired air gap between said rotor member and respective pole face.

35. A magnetic suspension system as set forth in claim 31 which includes, feedback means for connecting said air gap sensing means with said means for controlling the current, and said feedback means being operable to receive from said air gap sensing means input signals proportional to the measured width of said air gap and transmit to said control means responsive output signals to actuate said control means to adjust the magnitude of current in at least one coil of said electromagnets to maintain a preselected air gap width.

* * * * *

UNITED STATES PATENT AND TRADEMARK OFFICE
CERTIFICATE OF CORRECTION

PATENT NO. : 4,908,558
DATED : March 13, 1990
INVENTOR(S) : Robert E. Lordo and Lloyd W. McSparran It is certified that error appears in the above-identified patent and that said Letters Patent is hereby corrected as shown below:

Column 4, line 40 - at the beginning of the line change "above" to -- about --.

Signed and Sealed this

Fifteenth Day of January, 1991

Attest:

HARRY F. MANBECK, JR.

*Attesting Officer*  *Commissioner of Patents and Trademarks*